J. V. DEDRICK.
ADJUSTABLE SEAT FOR AUTOMOBILES.
APPLICATION FILED FEB. 18, 1915.
1,195,340.                                    Patented Aug. 22, 1916.
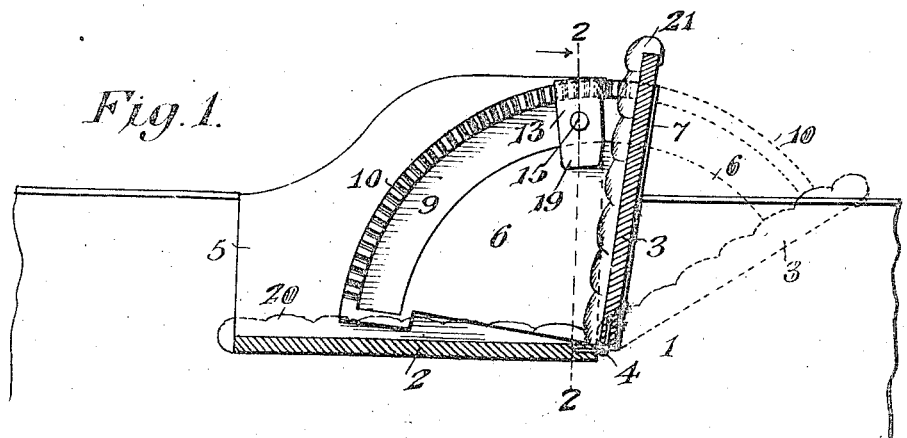
Fig.1.
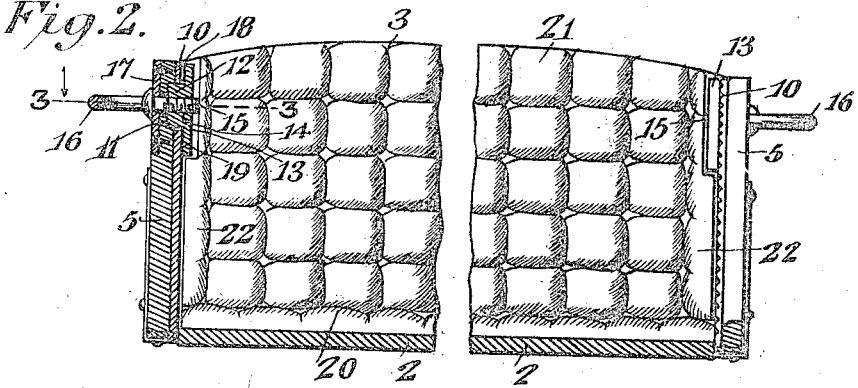
Fig.2.
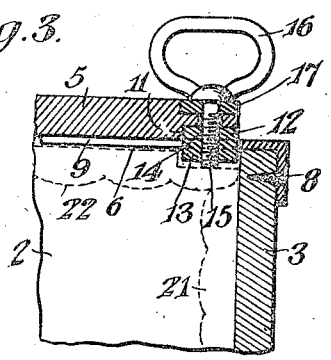
Fig.3.
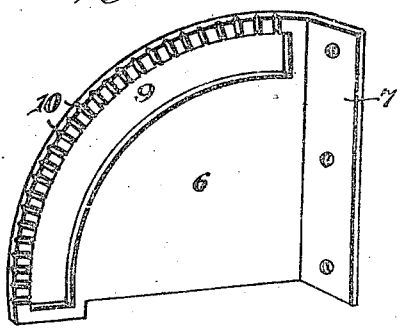
Fig.4.
WITNESSES                    Fig.5.              J. V. Dedrick, INVENTOR
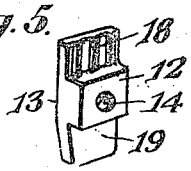
BY
ATTORNEY

UNITED STATES PATENT OFFICE.

JOHN V. DEDRICK, OF WEIMAR, TEXAS.

ADJUSTABLE SEAT FOR AUTOMOBILES.

1,195,340.
Specification of Letters Patent.
Patented Aug. 22, 1916.

Application filed February 13, 1915. Serial No. 9,146.

*To all whom it may concern:*

Be it known that I, JOHN V. DEDRICK, a citizen of the United States, residing at Weimar, in the county of Colorado and State of Texas, have invented a new and useful Adjustable Seat for Automobiles, of which the following is a specification.

This invention has reference to adjustable seats for automobiles, and is designed to provide means for the adjustment of the back of the front seat of an automobile whereby the occupant may adjust the back of the seat to a comfortable position, or even lay the back of the seat flat in order to permit the assumption of a prone position.

In accordance with the present invention the back member of the front seat is provided with a segmental rack-like and plate-like attachment at each end with a set screw capable of ready manipulation, and a lock nut engaged by the screw and in turn engageable in the rack plate, so that the seat back is effectively locked and firmly held in any of numerous positions of adjustment.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation of the locking means as applied to the back of the front seat of an automobile with the seat structure shown in front to rear vertical section. Fig. 2 is a section on the line 2—2 of Fig. 1 but showing one side of the seat in elevation. Fig. 3 is a section on the line 3—3 of Fig. 2 with the cushions omitted. Fig. 4 is a perspective view of the rack plate. Fig. 5 is a perspective view of the lock nut used in conjunction with the rack plate.

Referring to the drawings there is shown in more or less diagrammatic outline a small portion of the body 1 of an automobile, and also the showing includes the bottom 2 and back 3 of the front seat. Ordinarily the back 3 is in rigid relation to the seat portion 2 of the front seat, but in accordance with the present invention the back 3 is connected to the seat portion 2 by a hinge 4, so that it may be moved into various degrees of inclination from an upright to a horizontal position.

The seat portion 2 has side members 5 in fixed relation thereto. Secured to opposite ends of the back 3 of the seat are segmental plates 6, one of which is shown separately in Fig. 4. Each plate 6 has at one straight edge an angle flange 7 which is applied to the back 3 and secured thereto by fastening devices 8 which may consist of ordinary screws. The plate 6 defines a segment of approximately 90° and adjacent to its curved edge it is formed with a similarly curved slot 9 struck from the axis of the hinge 4 so that the plate will turn with the back 3 upon the hinge 4. Between the curved slot 9 and the outer edge of the plate the surface of the plate is formed with a series of radial notches 10 which may be approximately coextensive with the length of the slot 9.

Each side member 5 adjacent to the point occupied by the upper end of the back 3 when in the ordinary upright position is recessed on the inner face, as indicated at 11, to receive a lug 12 projecting from one face of an elongated block 13 about midway of the length of this block. The block 13 has a tapped passage 14 extending through the lug 12 and receiving a threaded shank 15 having at one end a handle 16 by means of which the threaded shank, constituting a lock screw, may be manipulated. On the outer face of each side 5 in position corresponding to the location of the recess 11 is a bearing plate 17 through which the threaded stem or screw 15 passes, and which is engaged by the handle 16.

The block 13 extends in opposite directions from the lug 12 and on one side is formed with a series of ridges 18 adapted to the notches 10 and on the other side has a plane extension 19 adapted to engage against the inner face of the segmental plate 6 adjacent to the inner edge of the slot 9.

The seat 2 and back 3 are provided with the usual cushions 20 and 21, respectively.

Under ordinary conditions the back 3 is employed in the usual upright position, in which case the plate 6 has one radial edge resting upon or in very close relation to the seat 2 and the lock nut or block 13 is then close to the upper front face of the back 3. The side cushions represented at 22 are ordinarily not interfered with by the nut 13 and plate 6, since these parts need not be very thick, and do not occupy any such relative depth as indicated in the drawings, the proportions being exaggerated in the drawings in order to more clearly show the structure.

If it be desired to tilt the back 3 to a greater extent than the ordinary position, the handle 16 is turned to loosen the nut 13, so that the ribs 18 on the nut no longer forcibly hold in the notches 10, and the back may be pulled to any desired position, after which on tightening the screw 15 the nut is again clamped against the plate 6 with the lugs or projections 18 seated in their notches 10 and the extension 19 bearing against the corresponding portion of the plate 6, the lug 12 extending through the slot 9 and being seated in the recess 11. The same action, of course occurs on both sides of the seat, so that the back of the seat is firmly held in any adjusted position. If for any reason the user of the automobile desires to assume the prone position the back 3 is lowered to a level and all liability of catching anything between the back 3 and the sides of the body of the vehicle is prevented by the presence of the plates 6 which ordinarily are hidden behind the side cushions 22.

While the invention has been described as applied to an automobile seat, it will be understood that it may be fitted to any seat, and especially to any vehicle seat, and the term automobile is not to be considered as limiting the invention to such particular type of vehicle, but to include any type of vehicle whether self propelled or not.

What is claimed is:—

1. Adjusting means for an automobile seat having relatively fixed seat and side portions and a back hinged to the seat portion, comprising segmental plates fast to opposite ends of the back and movable along the side portions of the seat about the axis of the hinge between the seat and back portion, each of said plates being formed with a slot curved about the axis of the hinge and close to the outer edge of the plate with the latter provided with a curved series of notches between the slot and said outer edge of the plate, a clamp screw mounted on each side of the seat and projecting through the slot in the corresponding segmental plate, and a nut for each clamp screw provided with an intermediate lug of non-circular shape entering the slot in the plate and having extensions on opposite sides of the lug, one of the extensions being formed with projections fitting the notches in the plate and the other extension being smooth and engaging the plate on the side of the slot toward the axis of the hinge.

2. Adjusting means for an automobile seat having seat and side portions in substantially fixed relation one to the other and a back hinged to the seat portion, comprising segmental plates fast to the ends of the back portion and each provided with a flange at one radial edge by which the plate is secured to the corresponding end of the back of the seat, each plate having a curved edge described about the axis of the hinge of the seat back and a curved slot adjacent to said curved edge and between the curved slot and the curved edge provided with a curved series of notches, an elongated nut having a central lug projecting through the slot in the plate with extensions on opposite sides of the lug, one of which extensions is provided with projections adapted to the notches in the plate and the other extension projecting over the plate on the side of the slot remote from the projections, and a screw provided with a manipulating means and carried by the respective side of the seat, said screw extending through the side of the seat with the manipulating means outward and with the threaded portion of the screw entering the nut.

In testimony, that I claim the foregoing as my own, I have hereto affixed my signature in the presence of two witnesses.

JOHN V. DEDRICK.

Witnesses:
JNO. C. HUBBARD,
H. BRASHER, Jr.